(12) United States Patent
Thibault et al.

(10) Patent No.: US 11,724,886 B2
(45) Date of Patent: Aug. 15, 2023

(54) SAFETY DEVICE FOR PUSH CONVEYOR

(71) Applicant: AMF Automation Technologies, LLC, Sherbrooke (CA)

(72) Inventors: Marc-Olivier Thibault, Martinville (CA); Hugues Roy, Sherbrooke (CA); Simon Roy-Croteau, Sherbrooke (CA); Jimmy Belval, Sherbrooke (CA); Alain Lemieux, Sherbrooke (CA); Christian Chatelois, Sherbrooke (CA)

(73) Assignee: AMF AUTOMATION TECHNOLOGIES, LLC, Sherbrooke (CA)

( * ) Notice: Subject to any disclaimer, the term of this patent is extended or adjusted under 35 U.S.C. 154(b) by 65 days.

(21) Appl. No.: 17/444,768

(22) Filed: Aug. 10, 2021

(65) Prior Publication Data

US 2023/0052922 A1 Feb. 16, 2023

(51) Int. Cl.
*B65G 19/24* (2006.01)
*B65G 43/02* (2006.01)

(52) U.S. Cl.
CPC .............. *B65G 43/02* (2013.01); *B65G 19/24* (2013.01); *B65G 2203/0283* (2013.01); *B65G 2207/40* (2013.01)

(58) Field of Classification Search
CPC ................................. B65G 19/24; B65G 43/02
USPC .................................................. 198/717, 731
See application file for complete search history.

(56) References Cited

U.S. PATENT DOCUMENTS

| | | | | |
|---|---|---|---|---|
| 2,155,306 A | * | 4/1939 | Ferguson | B65G 19/245 198/733 |
| 2,269,056 A | * | 1/1942 | Guest | B65G 19/24 198/731 |
| 2,290,077 A | * | 7/1942 | De Los Sinden | B65G 19/16 198/731 |
| 2,546,262 A | * | 3/1951 | Hatcher | B65G 19/24 198/731 |
| 2,614,685 A | * | 10/1952 | Miller | B65G 19/24 59/93 |
| 2,756,868 A | * | 7/1956 | Russell | B65G 19/08 403/375 |
| 2,861,677 A | * | 11/1958 | Van Marle | A47F 5/0025 198/732 |
| 2,889,916 A | * | 6/1959 | Price, Sr. | B65G 19/22 198/731 |
| 3,139,174 A | * | 6/1964 | Genter | B65G 17/42 198/731 |
| 4,079,833 A | * | 3/1978 | Rollins | B65G 19/24 198/733 |
| 4,441,605 A | * | 4/1984 | Ronco | B65G 19/22 198/731 |
| 4,501,351 A | * | 2/1985 | Tracy | B65G 17/44 198/803.12 |

(Continued)

Primary Examiner — Douglas A Hess
(74) Attorney, Agent, or Firm — Brouillette Legal Inc.; Robert Brouillette

(57) ABSTRACT

A flight conveyor for conveying articles while preventing injuries to an operator, the flight conveyor comprising a frame defining a trough, a drive system defining a rotating pathway and at least one flight driven by the drive system along the rotating pathway for conveying the articles through the trough, wherein the at least one flight is detachably fastened to the drive system and configured to be detached when subjected to a resistive force capable of injuring an operator.

21 Claims, 11 Drawing Sheets

(56) References Cited

U.S. PATENT DOCUMENTS

| | | | | |
|---|---|---|---|---|
| 4,747,481 A * | 5/1988 | Gorlov | B65G 19/26 |
| | | | 198/732 |
| 4,832,183 A * | 5/1989 | Lapeyre | B65G 17/08 |
| | | | 198/690.2 |
| 4,997,081 A * | 3/1991 | Sutin | B65G 19/26 |
| | | | 198/728 |
| 5,711,412 A * | 1/1998 | Gysin | B65G 15/44 |
| | | | 198/732 |
| 5,724,785 A * | 3/1998 | Malanowski | B65B 21/24 |
| | | | 53/259 |
| 5,964,461 A * | 10/1999 | Ende | B65H 5/16 |
| | | | 271/271 |
| 6,854,591 B1 * | 2/2005 | Lomerson, Jr. | B65G 19/24 |
| | | | 198/730 |
| 7,017,733 B2 * | 3/2006 | Pfankuch | B65H 5/16 |
| | | | 198/731 |
| 8,776,993 B2 * | 7/2014 | Umeda | B65G 15/58 |
| | | | 198/370.09 |
| 10,822,180 B2 * | 11/2020 | Binford | B65G 19/24 |

\* cited by examiner

SAFETY DEVICE FOR PUSH CONVEYOR

CROSS-REFERENCE TO RELATED APPLICATIONS

There are no cross-related applications.

FIELD OF THE INVENTION

The present invention generally relates to safety devices for push conveyors. More specifically, the present invention relates to a push conveyor comprising detachable flights for avoiding injury to an operator.

BACKGROUND OF THE INVENTION

In the conveyance of articles, such as, for example, loaves of bread in wrapping or packaging machines, the articles are frequently carried or pushed or otherwise contacted by spaced members or flights which distribute the forces exerted on the articles and which furthermore enable the alignment of the articles as desired.

In certain conveyance systems, paddles or flights are attached to single or double strands of chain. The said paddles or flights drag or push the articles over a low-friction surface. Chain and flight conveyors are well known in the art as they are simple in design, sturdily constructed, easy to maintain and provide an efficient, yet economical and dependable conveyance means for articles.

Chain and flight conveyors typically rely on a series of metal, wood, or plastic flights attached at intervals to one or two strands of endless chain which drive the flights along a trough with the chain or chains passing around sprockets at the ends of the trough. In doing so, the flights push or slide the articles along the trough.

Despite their benefits, common flight conveyors do present certain safety concerns as operators are often required to retrieve articles from the trough during conveyance such as, for example, when the articles have reached the end of the flight conveyor or when they become lodged or jammed within the flight conveyor. These maneuvers present countless risks to operators as a hand or a limb may get stuck in or underneath a flight while the flight conveyor is in operation.

There is therefore a need for an improved flight conveyor with improved safety for the operators.

SUMMARY OF THE INVENTION

The shortcomings of the prior art are generally mitigated by a flight conveyor comprising a frame, an endless drive system rotating about the frame and at least one detachable flight driven by the endless drive system the at least one flight being configured to be detached when subjected to a lateral force exceeding a predetermined threshold force.

In one aspect of the invention, the endless drive system may comprise a mounting bracket, the at least one flight being detachably affixed to the mounting bracket. The endless drive system may further comprise at least one chain, the chain comprising attachment pins protruding from the chain to mount the mounting bracket. The at least one detachable flight may comprise a resilient connector and the mounting bracket comprising an aperture adapted to attachably receive the resilient connector, the resilient connector being a spring-pin connector.

In another aspect of the invention, the at least one detachable flight may be detachably affixed to the drive system using a magnetic connector and the predetermined threshold force may be greater than 75 N. The flight conveyor may further comprise a flight detachment sensor and at least one plate for preventing access to the endless drive system with the flight is made of resilient material.

A method of safely conveying articles is also provided. The method comprises the steps of detachably fastening at least one detachable flight to an endless drive system of a flight conveyor, driving the at least one detachable flight to convey articles through the flight conveyor and automatically detaching the at least one detachable flight from the endless drive system when the at least one detachable flight is subjected to a lateral force exceeding a predetermined threshold force.

In one aspect of the invention, detachably fastening the at least one detachable flight may comprise using a resilient fastener or magnetic forces. The method may further comprise detecting if one of the at least one detachable flight has been detached.

In another aspect of the invention, the method may further comprise automatically stopping the drive system if one of the at least one detachable flight has been detached and detachably fastening the at least one detachable flight may comprise detachably fastening the at least one detachable flight to a mounting bracket.

A detachable flight is also provided. The detachable flight comprises a body comprising a first and a second detachable end, the first and second ends being attachable to an endless drive system and the first and second ends being detachable from the endless drive system when subjected to a lateral force exceeding a predetermined threshold force.

In one aspect of the invention, the first and second ends may each comprise a resilient connector attachable to the endless drive system and the body may be an elongated member having two extreme portion and a central portion, the central portion being resiliently slidable within the two extreme portions.

In another aspect of the invention, the first and second ends may each comprise a magnetic portion having a polarity being opposite to a polarity of the endless drive system.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which.

DETAILED DESCRIPTION OF THE PREFERRED EMBODIMENT

A novel safety device for a push conveyor will be described hereinafter. Although the invention is described in terms of specific illustrative embodiments, it is to be understood that the embodiments described herein are by way of example only and that the scope of the invention is not intended to be limited thereby.

Figure 1:
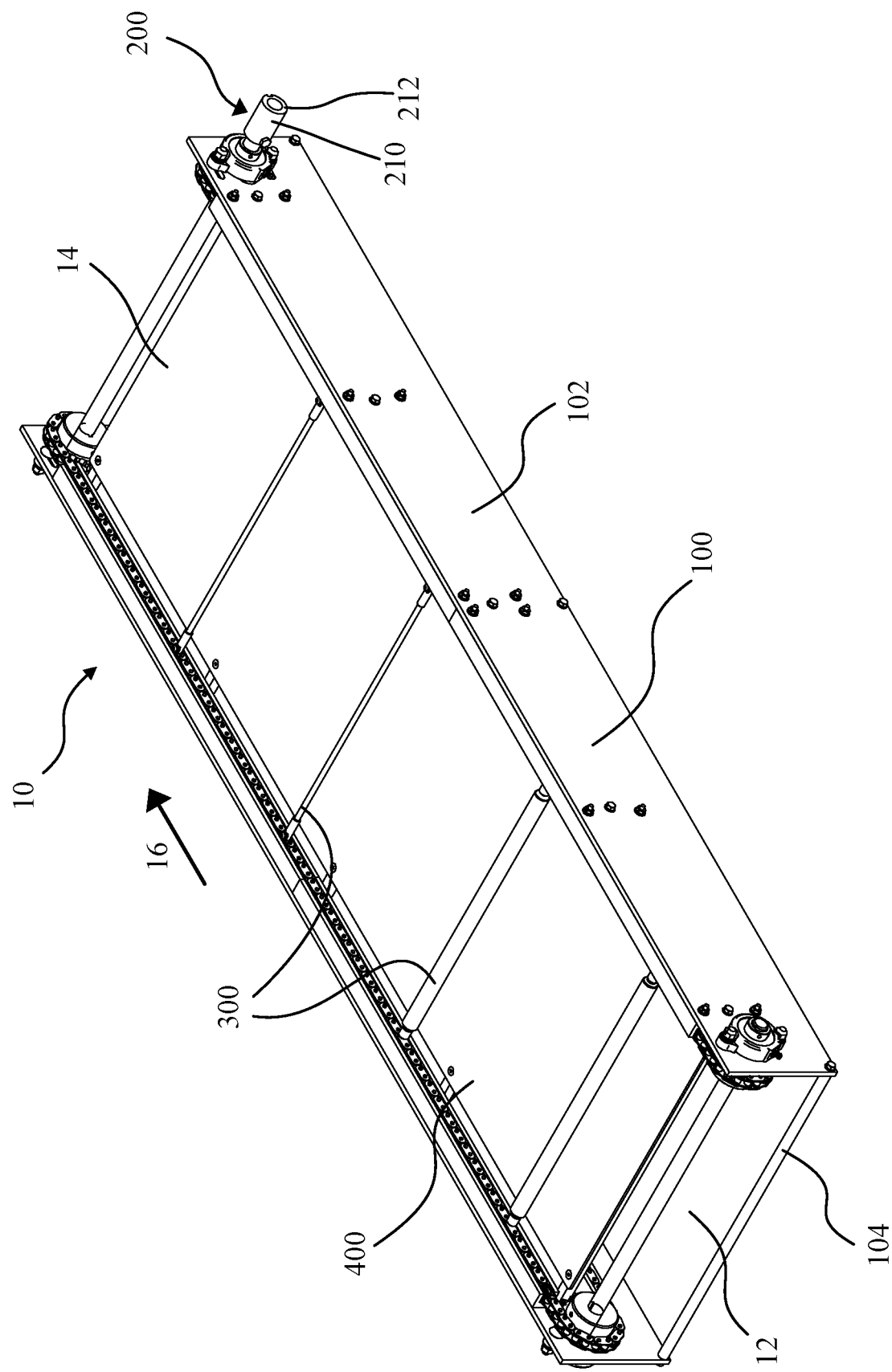
FIG. 1 is a perspective isometric view of an exemplary flight conveyor in accordance with the principles of the present invention.
Figure 2:
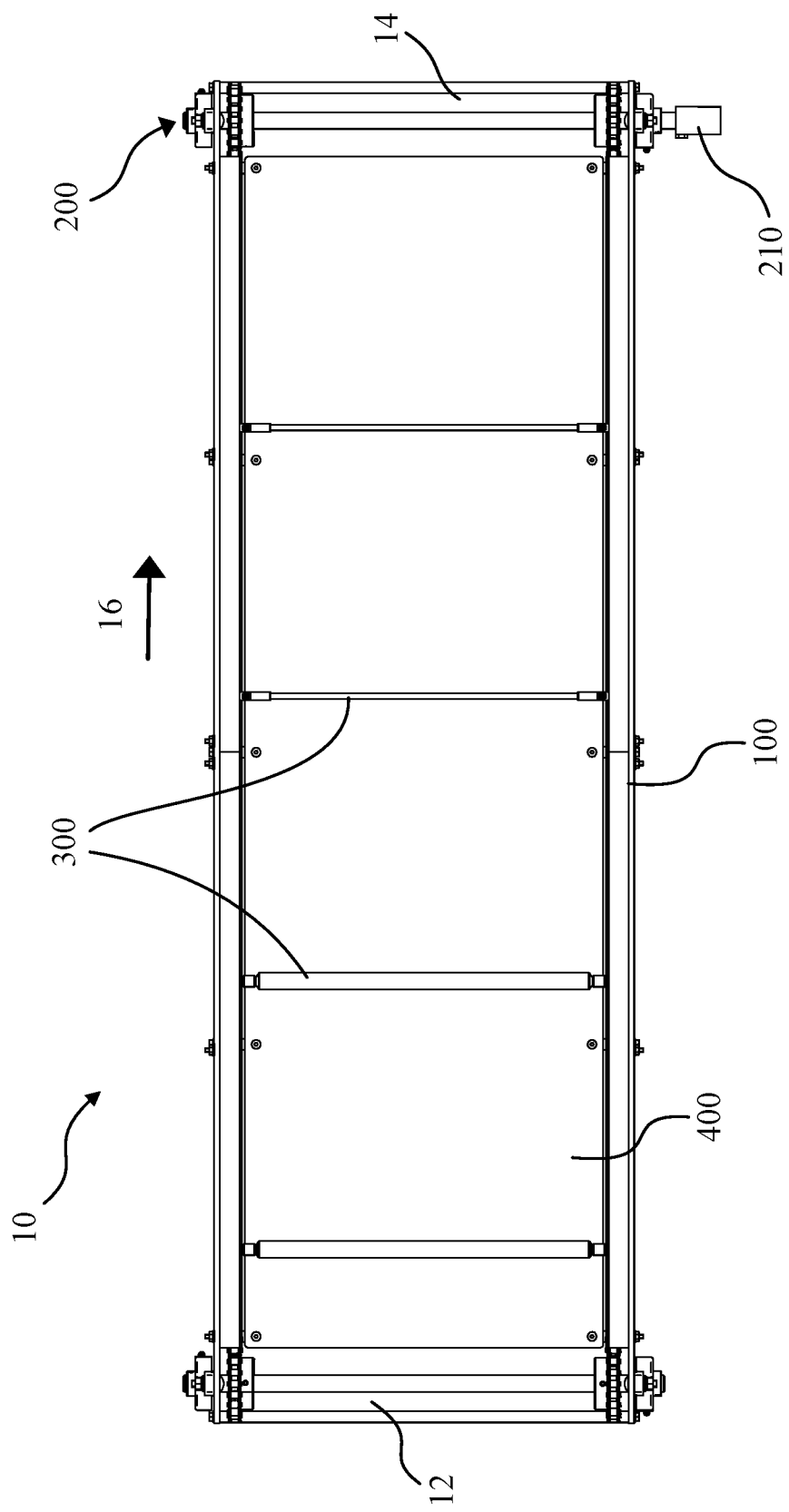
FIG. 2 is a top plan view of the flight conveyor of FIG. 1.

Referring to FIGS. 1 and 2, an embodiment of a flight conveyor 10 for conveying articles is illustrated. The flight conveyor 10 typically comprises a frame or general structure 100 defining a flat low-friction surface 400, a drive system 200 and one or more pallets or flights 300. Referring to FIG. 1, in such embodiment, the frame 100 broadly comprises two plates 102 interspaced using one or more structural rods 104. Understandably, the frame 100 may comprise any other suitable configuration.

Broadly speaking, the flight conveyor 10 receives articles (not shown) at a receiving end 12 and conveys them to an output end 14 in a traveling direction 16 using the flights 300 which move longitudinally over the flat surface 400 to push one or more articles therethrough. The flights 300 are displaced over and/or under the flat surface 400 by means of the drive system 200. Notably, the flight conveyor 10 comprises a safety feature allowing for the flights 300 to detach or release from the drive system 200 when the flights 300 are subjected to a threshold force such as to preferably prevent injuries to an operator.

Figure 10:
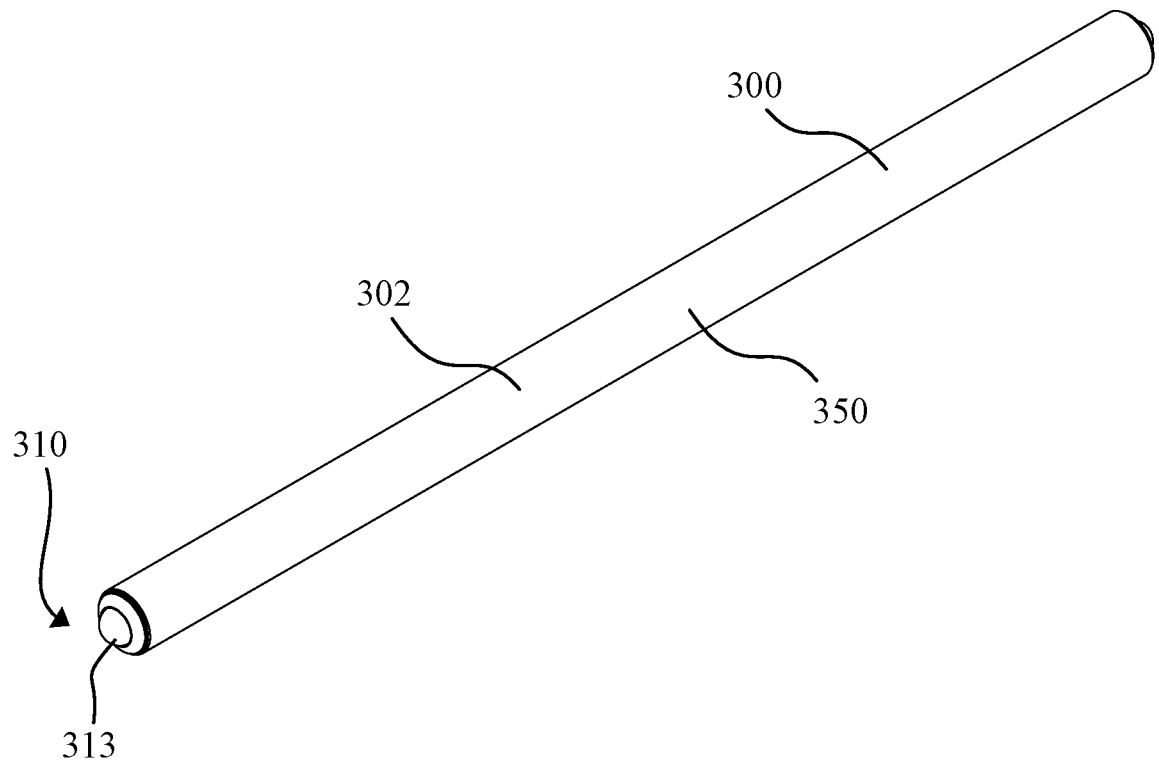
FIG. 10 is a perspective isometric view of another exemplary flight used in the flight conveyor of FIG. 1.

Referring to FIGS. 1, 2 and 10, in certain embodiments, the low-friction surface 400 may be separate from the frame 100 and positioned beneath and substantially parallel to the flights 300 and extending a portion or an entirety of the length of the flight conveyor 10 or drive system 200. The low-friction surface 400 may provide a surface for supporting the articles as they are conveyed across the flight conveyor 10 while minimizing the friction between the articles and the flight conveyor 10 thereby allowing for a lower threshold force. The use of a low-friction surface 400 may additionally prevent articles becoming stuck and inadvertently detaching the flights 300 as they convey the articles through the flight conveyor 10. In certain embodiments, the low-friction surface 400 may comprise a coefficient of kinetic friction sufficiently high to allow the articles to rotate and align an article with a flight 300 when engaged by said flight 300.

In certain embodiments, the drive system 200 may comprise a motor (not shown) adapted to drive an endless drive member defining a track or circuit for the flights 300. To do so, the motor may be mechanically connected to an input shaft 210 adapted to be rotated by the motor by any suitable attachment means (not shown) such as, for example, by receiving at a first end 212 a belt attached to the motor, an output shaft of the motor or an output shaft of a transmission. The input shaft 210 may transmit the rotational motion of the motor to the remainder of the drive system 200 by being connected at a second end to a drive wheel. The drive wheel in turn may be adapted to transmit rotational motion to the rotating pathway either directly or by means of additional gears, sprockets, chains, belts, or any combination thereof.

Figure 3:
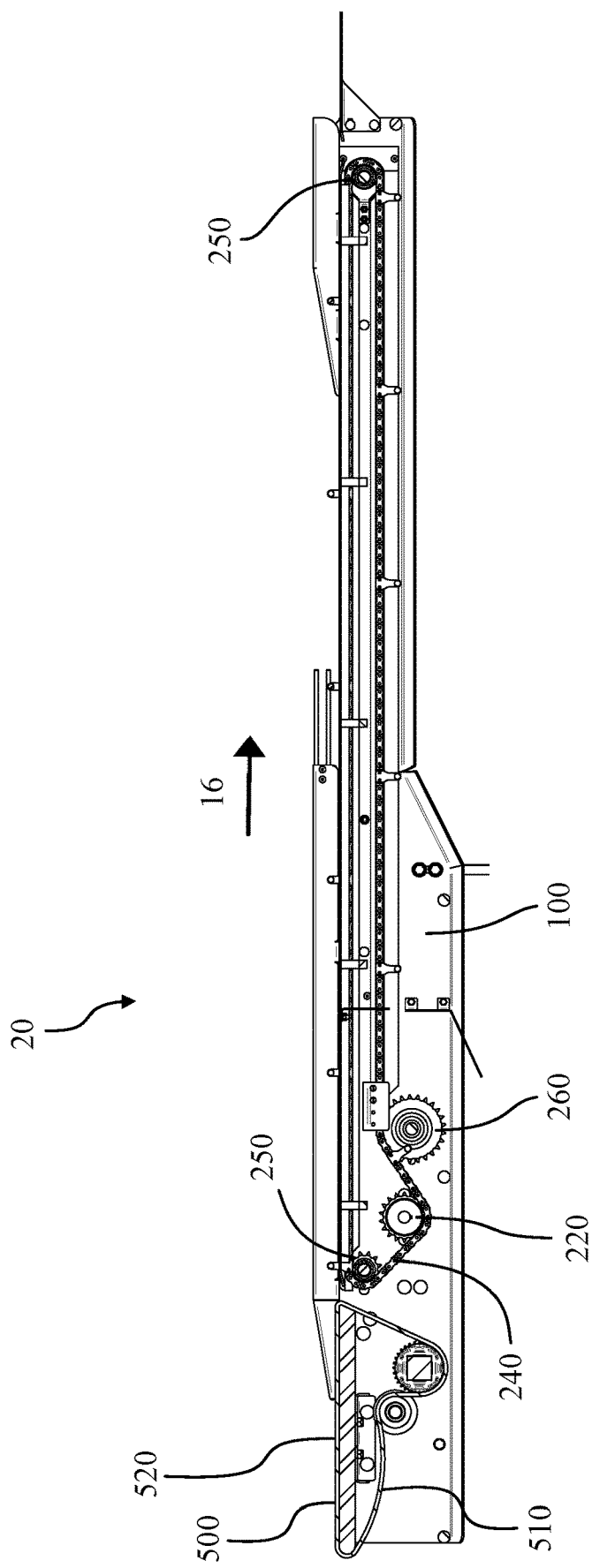
FIG. 3 is a side sectional view of the flight conveyor of FIG. 1.
Figure 4:
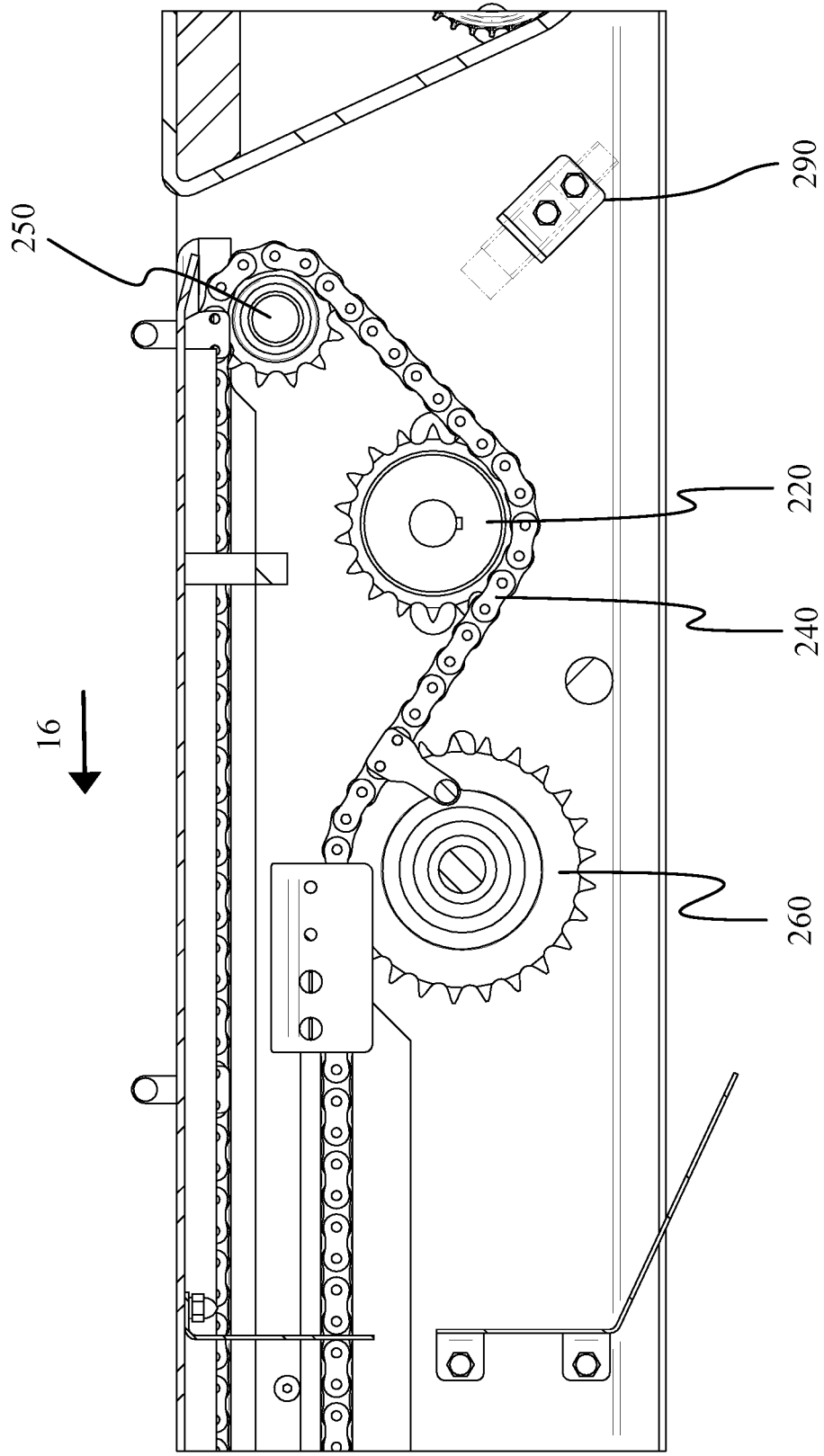
FIG. 4 is an expanded view of an exemplary drive system used in the flight conveyor of FIG. 1.

Referring now to FIGS. 2 to 4, another embodiment of a flight conveyor 20 is shown. In such an embodiment, the drive system 200 generally comprises a drive shaft 210, a drive wheel 220, an endless drive member 240 and idle wheels 250. The drive shaft 210 is operatively connected to the drive wheel 220 to translate the rotational motion of the drive shaft 210 to a rotational motion of the drive wheel 220. The drive shaft 210 may be embodied as an input shaft or any other mean to translate the power of the motor to the conveyor 20. The drive wheel 220 may be embodied as a drive sprocket as illustrated at FIGS. 3 and 4. The drive system 200 typically comprises two endless drive members 240, one on each side of the low-friction surface 400. The endless drive members may be embodied as a chain, an endless band, a track or any other perforated or indented material suitable to be driven by the drive wheel 220. Understandably, any other type of drive systems 200 known in the art may be used within the scope of the present invention.

In the illustrated embodiment, the drive system 200 comprises two endless roller chains 240. Each of the endless roller chains 240 surrounds the two idle wheels 250, typically each at each end of the drive system, and the drive wheel 220.

In some embodiments, the drive system 200 may additionally comprise a tensioner 260 adapted to tension the endless drive member 240 such as to ensure a proper functioning of the drive system 200. In some embodiments, the tensioner 260 is a sprocket. Understandably, any type of tensioner known in the art may be used within the scope of the present invention.

Figure 5:
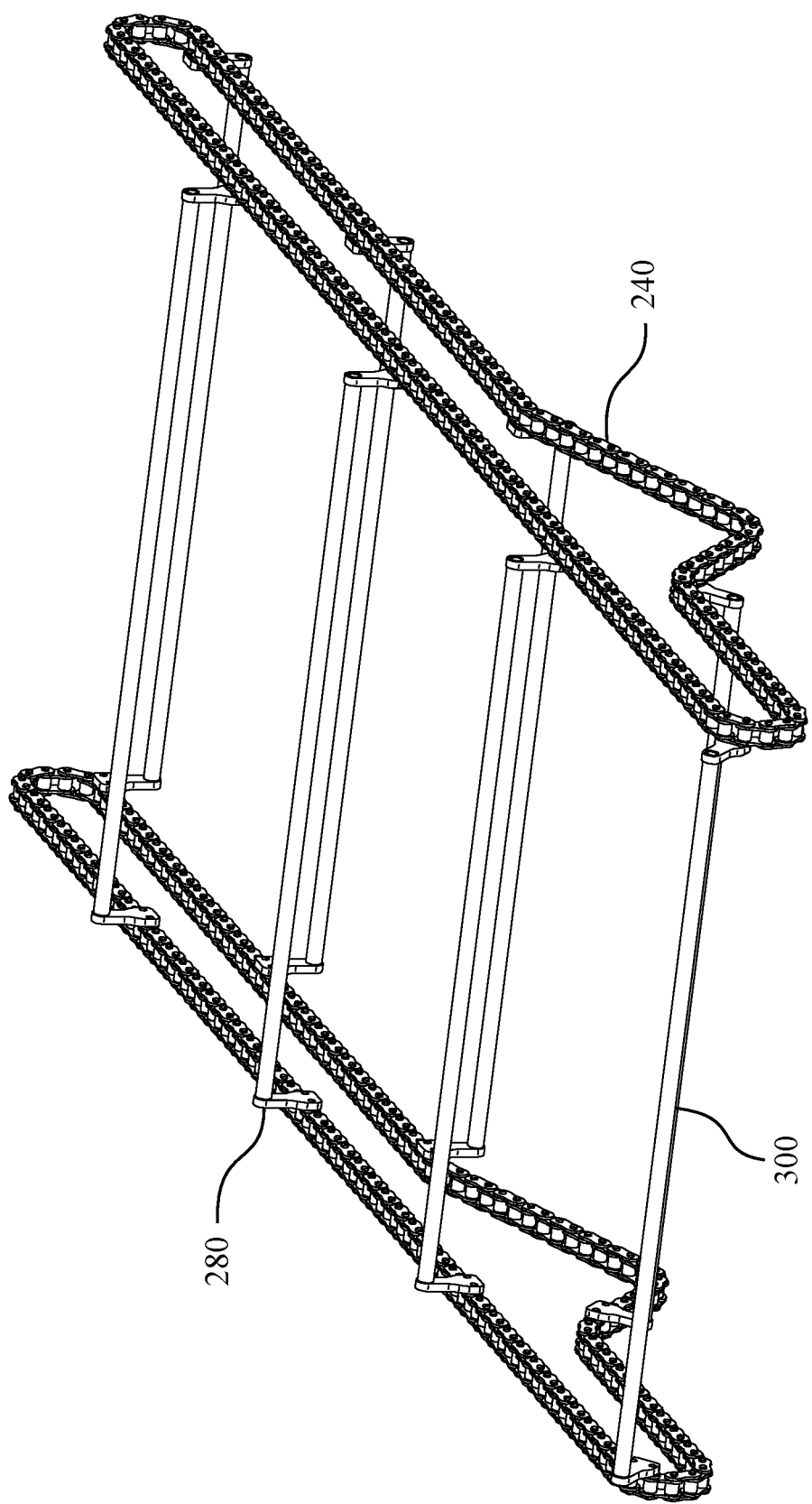
FIG. 5 is a perspective isometric view of exemplary endless roller chains and flights used in the flight conveyor of FIG. 1.
Figure 6:
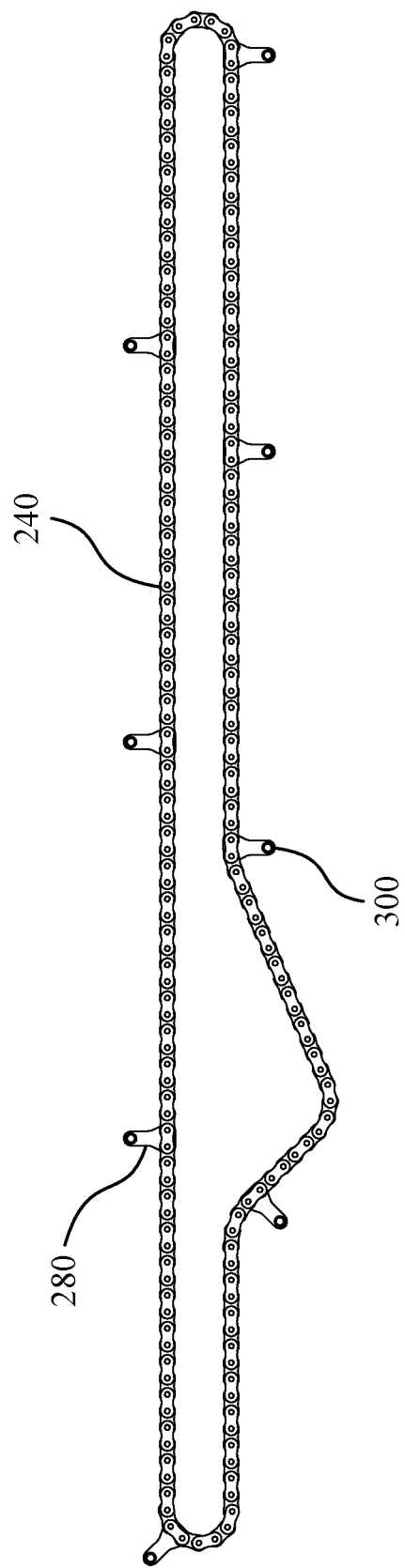
FIG. 6 is a side view of the exemplary endless roller chains and flights of FIG. 5.

The flight conveyor 10 may comprise more than two endless drive members 240 in embodiments having two low-friction surfaces in parallel. In the embodiment illustrated in FIG. 5, the flight conveyor 10 comprises two endless roller chains 240 configured in parallel to convey flights 300 disposed therebetween.

In certain embodiments, the drive system 200 may comprise mounting brackets 280 adapted to detachably receive the flights 300. The flights 300, when attached to the drive systems 200, may be driven along the pathway defined by the endless drive members 240.

Figure 13:
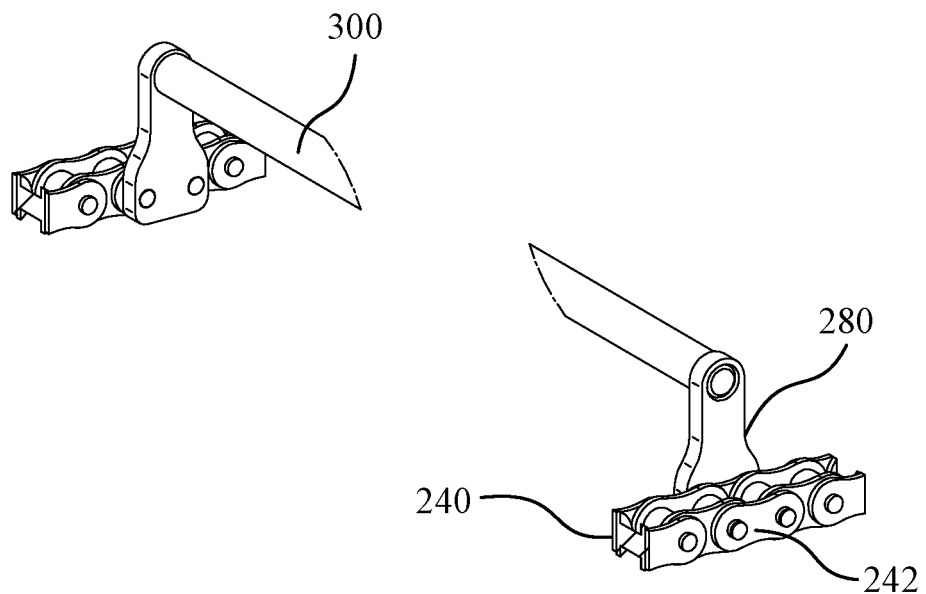
FIG. 13 is a perspective isometric sectional view of an exemplary flight, endless roller chains and mounting brackets used in the flight conveyor of FIG. 1.
Figure 14:
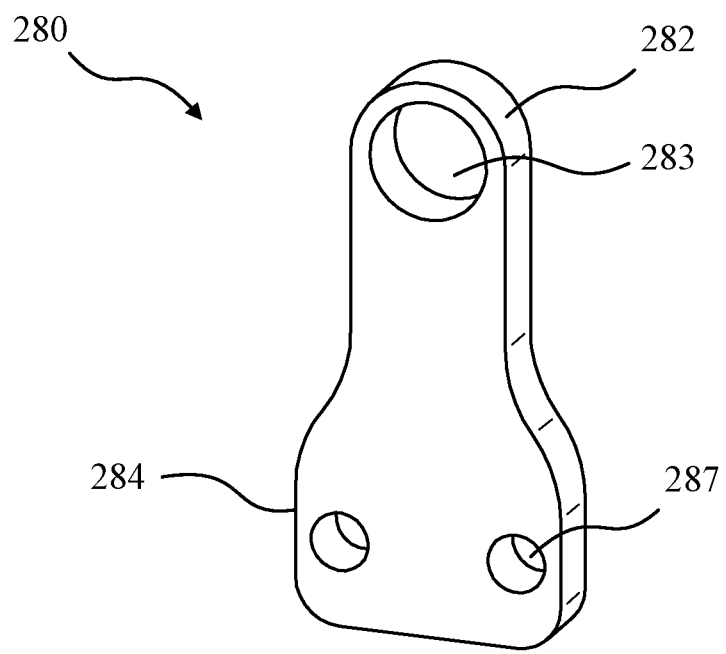
FIG. 14 is a perspective isometric view of an exemplary mounting bracket used in the flight conveyor of FIG. 1.
Figure 15:
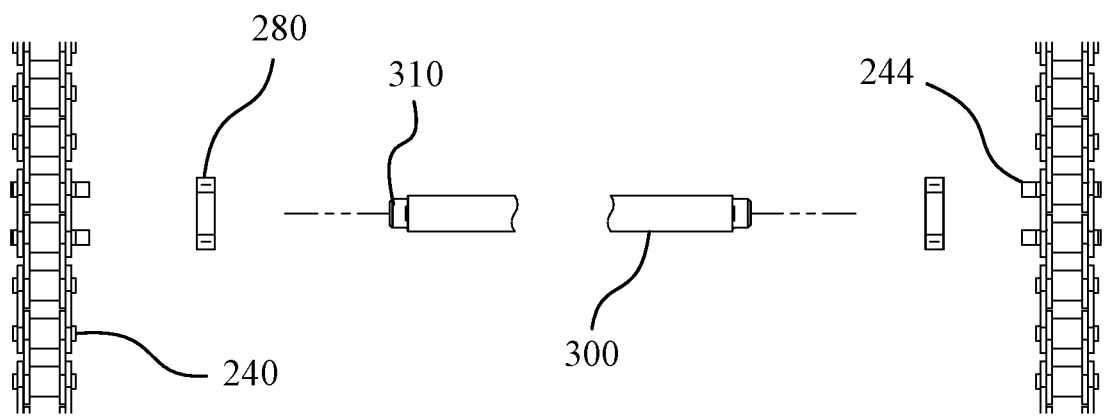
FIG. 15 is a top exploded view of the exemplary flight, endless roller chains and mounting brackets of FIG. 13.

Referring now to FIG. 14, an embodiment of a mounting bracket 280 is illustrated. The mounting bracket 280 may comprise an upper portion 282 adapted to detachably receive or support a flight 300 and a lower portion 284 adapted to be affixed to the endless roller chain 240. The mounting brackets 280 may be affixed to the endless drive member 240 using any suitable means such as, for example, fasteners, pins, rivets or an adhesive. Referring to FIGS. 13 and 15, the endless drive member 240 is embodied as a chain. In such embodiment, the chain 240 comprises links 242. Some links comprise pins 244 laterally protruding from the chain 240.

The pins 244 are insertable in apertures 287 of the mounting brackets 280. As such, the mounting bracket 280 is fastened to the chain 240. Understandably, any other mechanical means known in the art to attach or mount the bracket 280 to the endless drive member 240 are within the scope of the present invention.

In other embodiments, the mounting bracket 280 may comprise pins (not shown) protruding substantially laterally therefrom and adapted to be insertable in apertures of the links 242 such as to fasten the mounting bracket 280 to the chain 240.

As previously stated, the flights 300 detach or release from the drive system 200 when the flights 300 are subjected to a threshold force. The threshold force is generally determined as a maximum force which may be sustained by a user without having an injury. The flights 300 generally detach from the system 10 to prevent injuries to an operator.

Figure 7:
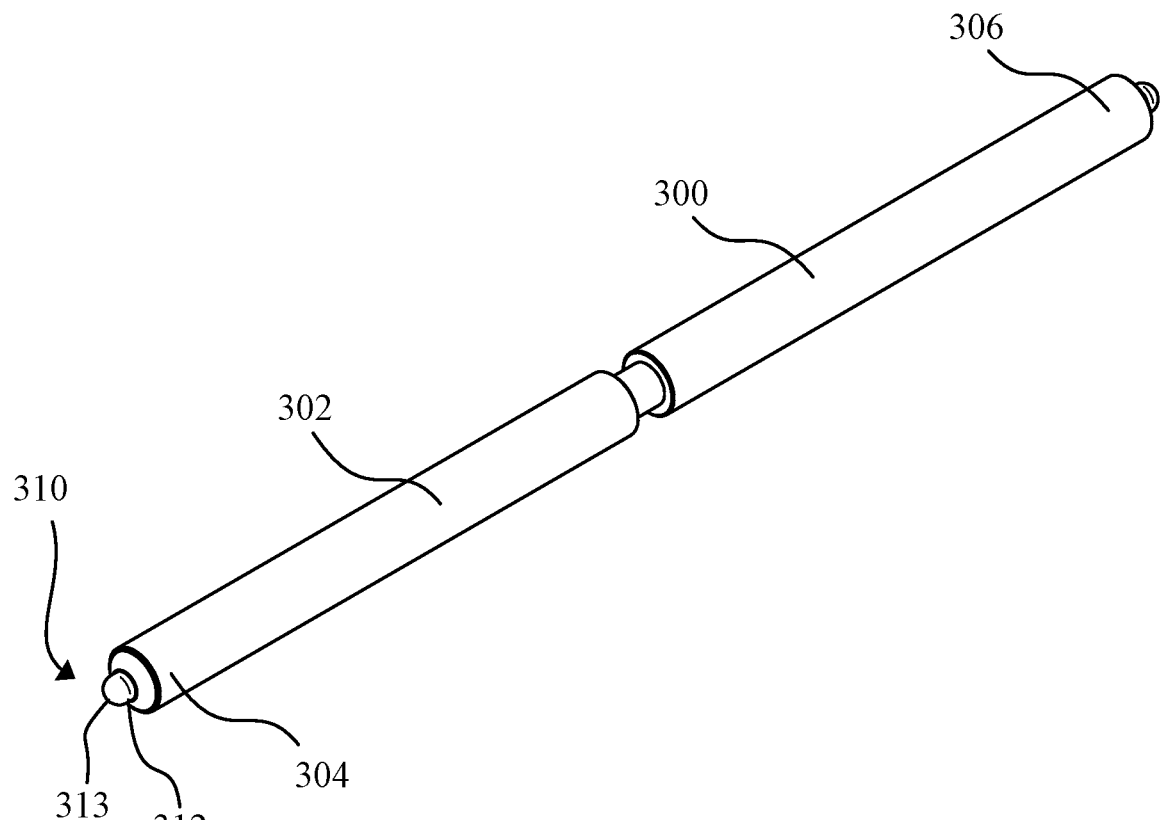
FIG. 7 is a perspective isometric view of an exemplary flight used in the flight conveyor of FIG. 1.

Referring now to FIGS. 7 to 11, a flight 300 is generally embodied as elongated member 302. The flight 300 comprises resilient member 310 at each end 304, 306. In some embodiments, as illustrated at FIG. 7, the resilient member 310 may be embodied as spring-pins 312. The spring-pins 312 are adapted to be received within an aperture/opening 283 of the mounting brackets 280. Referring to FIG. 14, the aperture 283 is located at the upper portion 282 of the mounting bracket 280. Accordingly, the flights 300 may be detachably affixed to the upper portion 282 of the mounting brackets 280.

In certain embodiments, the spring-pins 312 comprise a curved surface 313. The curved surface 313 generally allows a longitudinal force to be applied to the spring-pin 312 as it is pushed against the aperture 283. The curved surface generally allows a lateral force to push the spring-pin 312 within the elongated member 302. When the threshold force is applied, as the resilient member 310 is pushed within the elongated member 302, the resilient member 310 exits from the aperture 283 and thus is detached from the drive system 200. The curvature and spring constant of the spring-pin 312 may be selected to define a threshold force for releasing the flight 300 from the mounting bracket 280. Typically, the threshold force being higher than a force suitable for pushing articles but below a force which may injure an operator.

Figure 8:
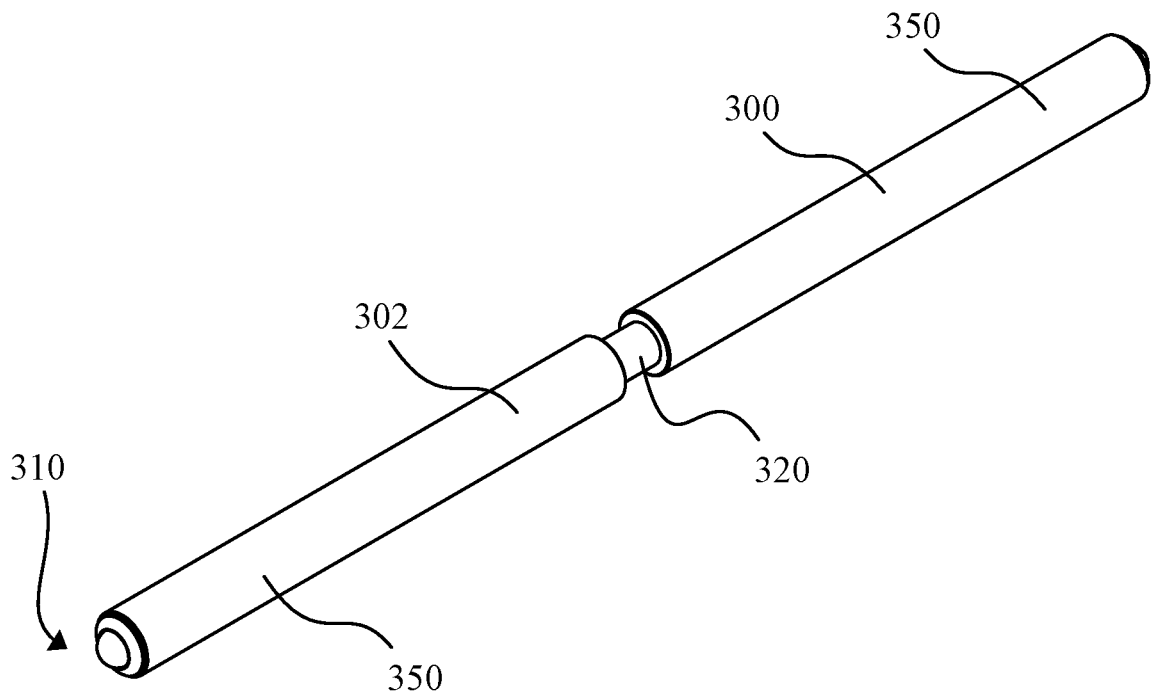
FIG. 8 is a perspective isometric view of another embodiment of a flight used in the flight conveyor of FIG. 1.

Referring now to FIG. 8, another embodiment of a flight 300 is illustrated comprising a resilient central portion 320 adapted to slide within and without the elongated member 302. When a longitudinal force is exerted on at least one end 304 or 306 the flight 300, the resilient central portion 320 slides in the elongated member, thus reducing the overall length of the flight 300, which detaches said flight 300 from the bracket 280. The central resilient portion 320 may be embodied as a single spring within a core of the flight 300 with the resilient members 310 and one or both sides of the elongated member 302 being rigid.

The central portion 320 may also be used to vary the length of the elongated member 302 to adapt to different operating conditions. As such, in some embodiments, the central portion 320 may comprise a threaded outer surface adapted to mate with a threaded inner surface of the elongated members 302.

Figure 9:
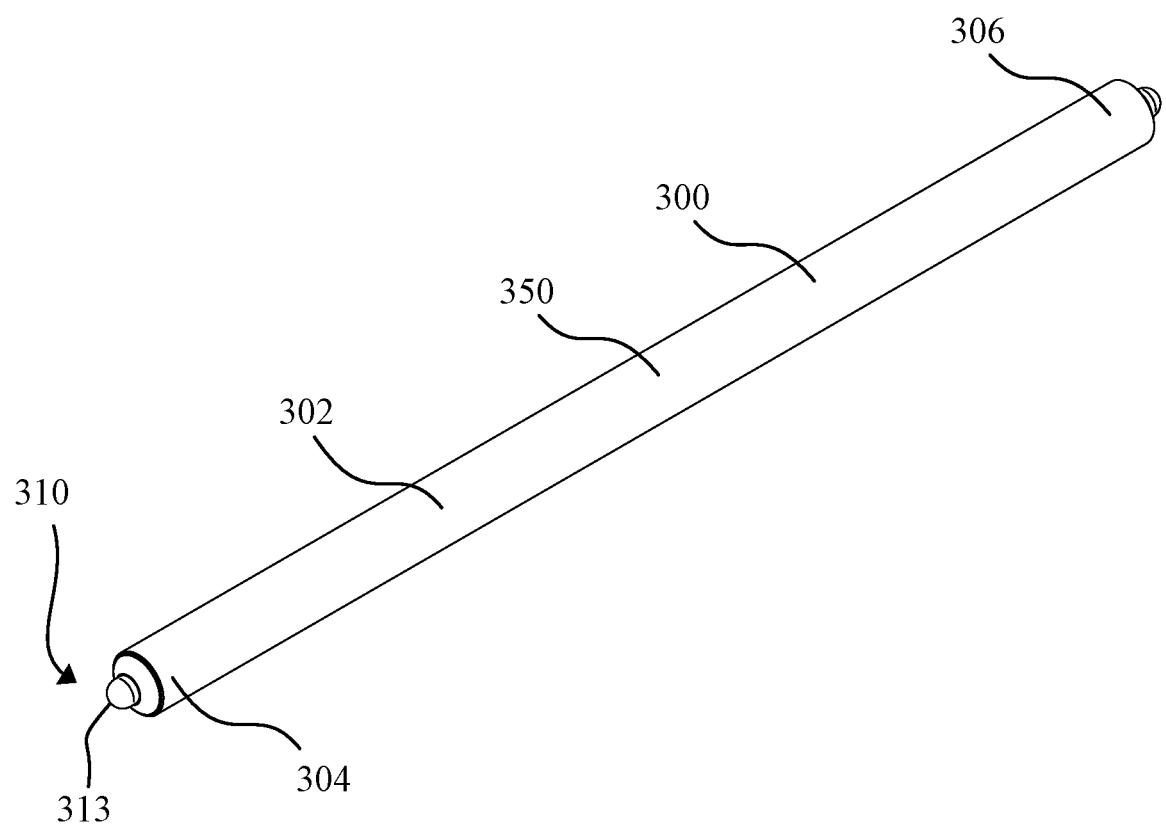
FIG. 9 is a perspective isometric view of yet another exemplary flight used in the flight conveyor of FIG. 1.

Referring now to FIGS. 9 and 10, certain embodiments of the flight conveyor 10 may comprise flights 300 comprising one elongated member 350 and resilient members 310, such as spring-loaded pin 313. In such embodiments, the resilient members 310 are deformed when the flight is subjected to a lateral force. In a preferred embodiment, the resilient members 310 are curved or rounded. The curved or rounded nature of the resilient members 310 ensure that lateral force exerted on the flight 300 allows the resilient member 310 to flex or to be pushed, as in the case of spring-loaded pins. As the resilient member 310 is flexed or pushed, the lateral force detach the flight 300 from the mounting brackets 280. Understandably, the threshold force may further be regulated by adjusting the shape and curvature of the curved surface 313.

In yet another embodiment, the elongated member 350 is adapted to be elastically deformed when subjected to a lateral force. Accordingly, when a lateral force is applied to the flight 300, the one or more resilient portions 350 may laterally flex and reduce the length of the flight 300 along its longitudinal axis. When the threshold force is applied, as the one or more resilient portions 350 flex, the length of the flight 300 along its longitudinal axis may be reduced such as to allow each end of the elongated member 350 to detach from the mounting brackets 280. In some embodiments, the flight may further comprise one or more connecting members 310 to be inserted in the mounting brackets 280. The connecting members 310 may be resilient. Understandably, the threshold force may further be regulated by using different resilient material and/or by changing the shape and dimension of the resilient elongated member 350.

Figure 11:
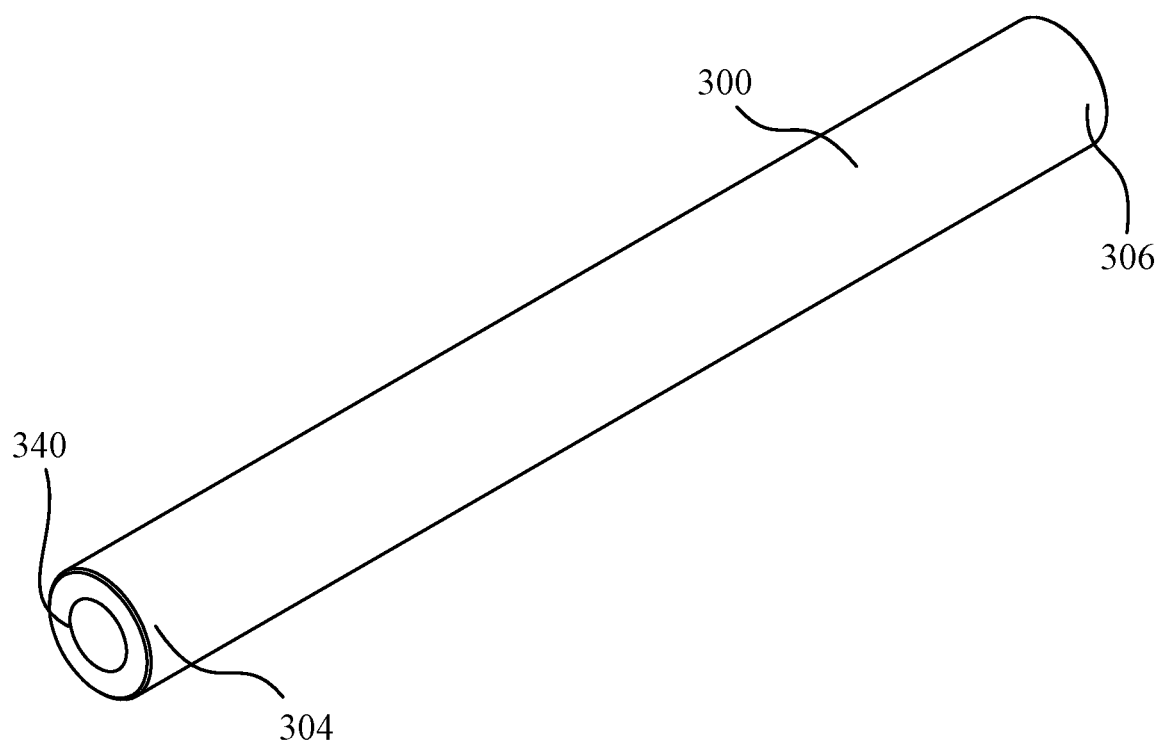
FIG. 11 is a perspective isometric view of yet another exemplary flight used in the flight conveyor of FIG. 1.

Referring now to FIG. 11, other embodiments of the flight conveyor 10 may comprise flights 300 comprising magnetic fasteners 340 disposed on either ends 304, 306 of the flights 300. In such embodiments, the apertures 283 of the mounting brackets 280 are magnetized thus providing combined mechanical and magnetic support of the flights 300. The magnetic properties and shape of the magnetic fasteners 340 may similarly be selected to define a threshold force for releasing the flight 300 from the mounting brackets 280 suitable for pushing articles but below a force which may injure an operator. In some embodiments, the aperture 283 is a recess adapted to receive the magnetic portion 340 of the flight 300.

In other embodiments still (not shown), the flights 300 may comprise a recess adapted to receive a spring-pin, a magnetic fastener of the mounting bracket 280 or any other suitable attachment means.

In other embodiments still, the mounting brackets 280 may comprise a resilient material adapted to elastically deform when subjected to a lateral force exerted by the flight 300 at the aperture 283. In this manner, the mounting brackets 280 may sufficiently flex when subjected to a threshold force such as to allow the flight 300 to be released from the aperture 283. In particular, the mounting brackets 280 may flex laterally, longitudinally, rotationally or in any other manner to release the flight 300 from the aperture 283. In such embodiment, the flight 300 may be made with rigid or semi-rigid material.

Understandably, the flights 300 and mounting brackets 280 may comprise any suitable or desirable combination of the aforementioned attachment means.

In other embodiments, the mounting brackets 280 may be detachably affixed to the endless drive member 240 using any of the aforementioned attachment means. In such embodiments, a flight 300 and its corresponding mounting brackets 280 may detach from the endless drive member 240 when a force exceeding a threshold force is exerted onto either of the flight 300 or the mounting brackets 280.

In certain embodiments, the mounting brackets 280 and flights 300 may be configured to define a threshold force being between 75 N and 150 N. In other embodiments, the mounting brackets 280 and flights 300 may be configured to instead define a threshold kinetic energy or threshold contact pressure which may be exerted on the flight 300 before being released. The threshold kinetic energy and threshold contact pressure are preferably selected according to a suitable kinetic energy and contact pressure which may be sustained by a user without having an injury. The mounting brackets 280 and flights 300 may be configured to define a threshold kinetic energy being between 4 J and 10 J. Similarly, the mounting brackets 280 and flights 300 may be configured to define a threshold contact pressure being approximately 50 N/cm$^2$.

Figure 12:
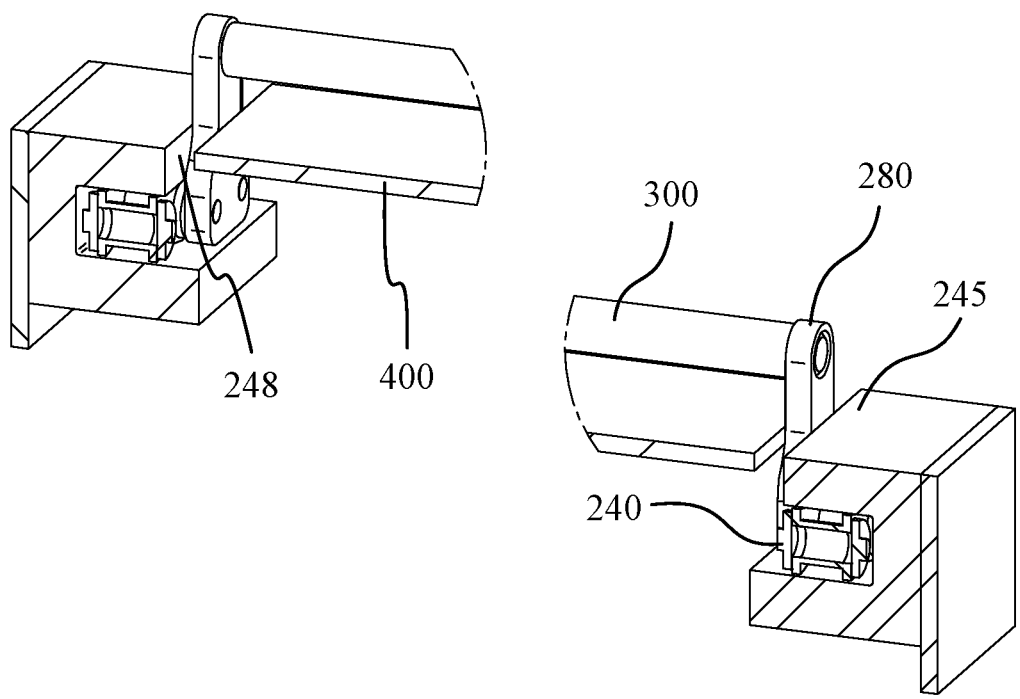
FIG. 12 is a perspective isometric sectional view of an exemplary flight, low-friction surface, endless roller chains and mounting brackets used in the flight conveyor of FIG. 1.

Referring to FIGS. 1 and 12, the flight conveyor 10 may further comprise chain plates 245 adapted to conceal and/or prevent access to the endless roller chains 240. The chain plates 245 may partially or entirely extend the length of the rotating pathway. In the illustrated embodiments, the chain plates 245 extend the length of the low-friction surface 400 such as to prevent contact between the endless chain rollers 240 and the articles being conveyed therethrough or the hands of an operator. As shown in FIG. 10, the chain plates 245 and the low-friction surface 400 may be disposed to define a narrow channel 248 adapted to allow the passage of the mounting brackets 280 while further limiting access to the endless roller chains 240. Such arrangement may further prevent damage to the flight conveyor 10 or the articles while preventing injuries to an operator.

Referring now to FIG. 3, the flight conveyor 10 may additionally comprise a powered conveyor belt 500 adapted to receive the articles at or near the output end 14. The conveyor belt 500 may offer a second form of conveyance for the articles as they reach the limit of the rotating pathway defined by the endless roller chains 240. Accordingly, the conveyor belt 500 may comprise a belt 510 rotating along a pathway defining an upper surface 520 being substantially in line with the low friction surface 400 such as to receive the articles. Understandably, the powered conveyor belt 500 may similarly be used to convey articles into the receiving end 12 of the flight conveyor 10.

Referring to FIG. 4, in certain embodiments, the flight conveyor 10 may be configured to detect when a flight 300 is detached from the drive system 200. In some embodiments, the flight conveyor 10 comprises a flight detachment sensor 290 adapted to detect whether one or more flights 300 have been detached from their respective mounting brackets 280. Still referring to FIG. 4, the sensor 290 may be located beneath the low-friction surface 400 near the endless drive member 240. The sensor 290 may be embodied as a proximity sensor, a photoelectric sensor, a contact sensor, a magnetic sensor or any other suitable presence sensing device. The sensor 290 may additionally be connected to a controller (not shown) configured to stop the motor if a flight 300 or any other desirable number of flights 300 are determined to have been detached.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A flight conveyor comprising:
   a frame;
   an endless drive system rotating about the frame; and
   at least one detachable flight driven by the endless drive system the at least one flight being configured to be detached when subjected to a lateral force exceeding a predetermined threshold force; and
   a flight detachment sensor.

2. The flight conveyor of claim 1, the endless drive system comprising a mounting bracket, the at least one flight being detachably affixed to the mounting bracket.

3. The flight conveyor of claim 2, the endless drive system comprising at least one chain, the chain comprising attachment pins protruding from the chain to mount the mounting bracket.

4. The flight conveyor of claim 2, the at least one detachable flight comprising a resilient connector and the mounting bracket comprising an aperture adapted to attachably receive the resilient connector.

5. The flight conveyor of claim 4, the resilient connector being a spring-pin connector.

6. The flight conveyor of claim 1, wherein the at least one detachable flight is detachably affixed to the drive system using a magnetic connector.

7. The flight conveyor of claim 1, wherein the predetermined threshold force is greater than 75 N.

8. The flight conveyor of claim 1 further comprising at least one plate for preventing access to the endless drive system.

9. The flight conveyor of claim 1, wherein the flight is made of resilient material.

10. The flight conveyor of claim 1, the at least one detachable flight comprising two ends, each of the two ends being detachably attached to the endless drive system.

11. The flight conveyor of claim 10, the at least one flight being configured to be detached when a portion of the detachable flight between the two ends is subjected to a lateral force exceeding the predetermined threshold force.

12. A method of safely conveying articles, the method comprising the steps of:
    detachably fastening at least one detachable flight to an endless drive system of a flight conveyor;
    driving the at least one detachable flight to convey articles through the flight conveyor; and
    automatically detaching the at least one detachable flight from the endless drive system when the at least one detachable flight is subjected to a lateral force exceeding a predetermined threshold force; and
    detecting if one of the at least one detachable flight has been detached.

13. The method of claim 12, wherein detachably fastening the at least one detachable flight comprises using a resilient fastener.

14. The method of claim 12, wherein detachably fastening the at least one detachable flight comprises using magnetic forces.

15. The method of claim 12 further comprising automatically stopping the drive system if one of the at least one detachable flight has been detached.

16. The method of claim 12, wherein detachably fastening the at least one detachable flight comprises detachably fastening the at least one detachable flight to a mounting bracket.

17. The method of claim 12 further comprising detachably fastening each of two ends of the at least one detachable flight to side members of the endless drive system.

18. A detachable flight comprising:
    a body comprising a first and an opposite second detachable ends;
    each of the first and second oppositeends being attachable to side members ofan endless drive system; and
    the first and second ends being detachable from any one oftheside members of the endless drive system when subjected to a lateral force exceeding a predetermined threshold force.

19. The detachable flight of claim 18, the first and second ends each comprising a resilient connector attachable to the endless drive system.

20. The detachable flight of claim 19, the body being an elongated member having two extreme portion and a central portion, the central portion being resiliently slidable within the two extreme portions.

21. The detachable flight of claim 16, the first and second ends each comprising a magnetic portion having a polarity being opposite to a polarity of the endless drive system.

* * * * *